No. 617,018. Patented Jan. 3, 1899.
N. O. HENAULT.
COMBINATION TOOL.
(Application filed Feb. 16, 1898.)
(No Model.) 2 Sheets—Sheet 2.
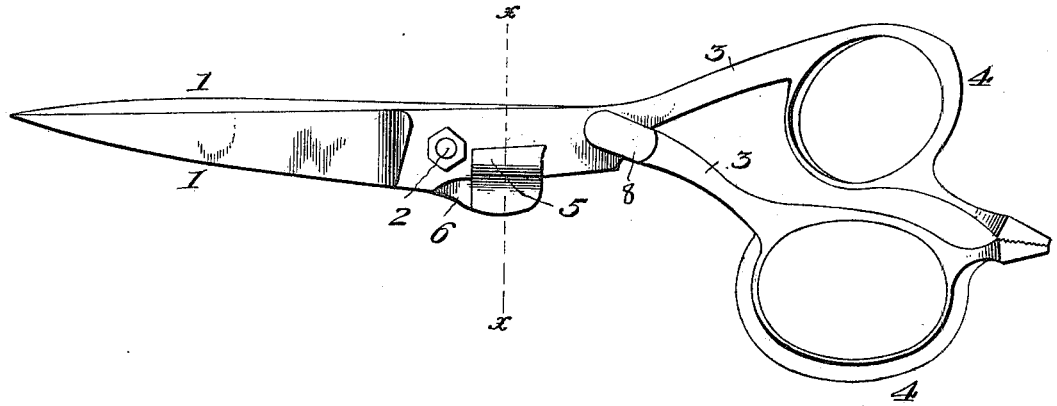
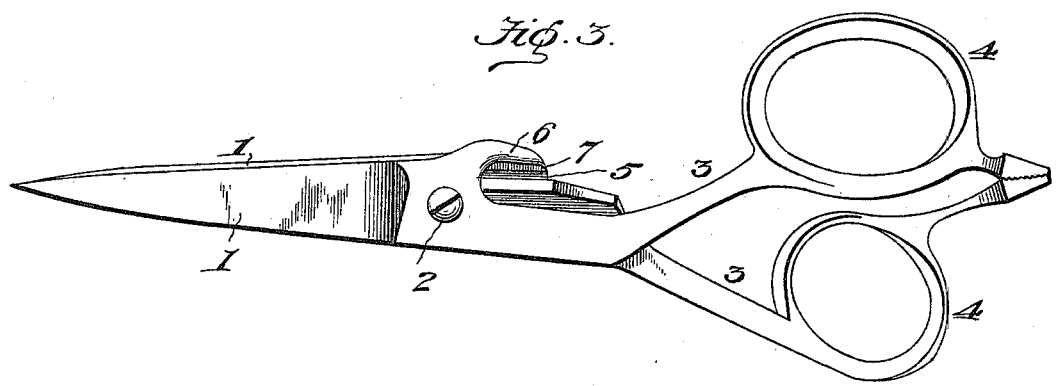
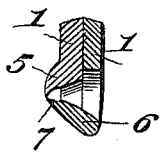

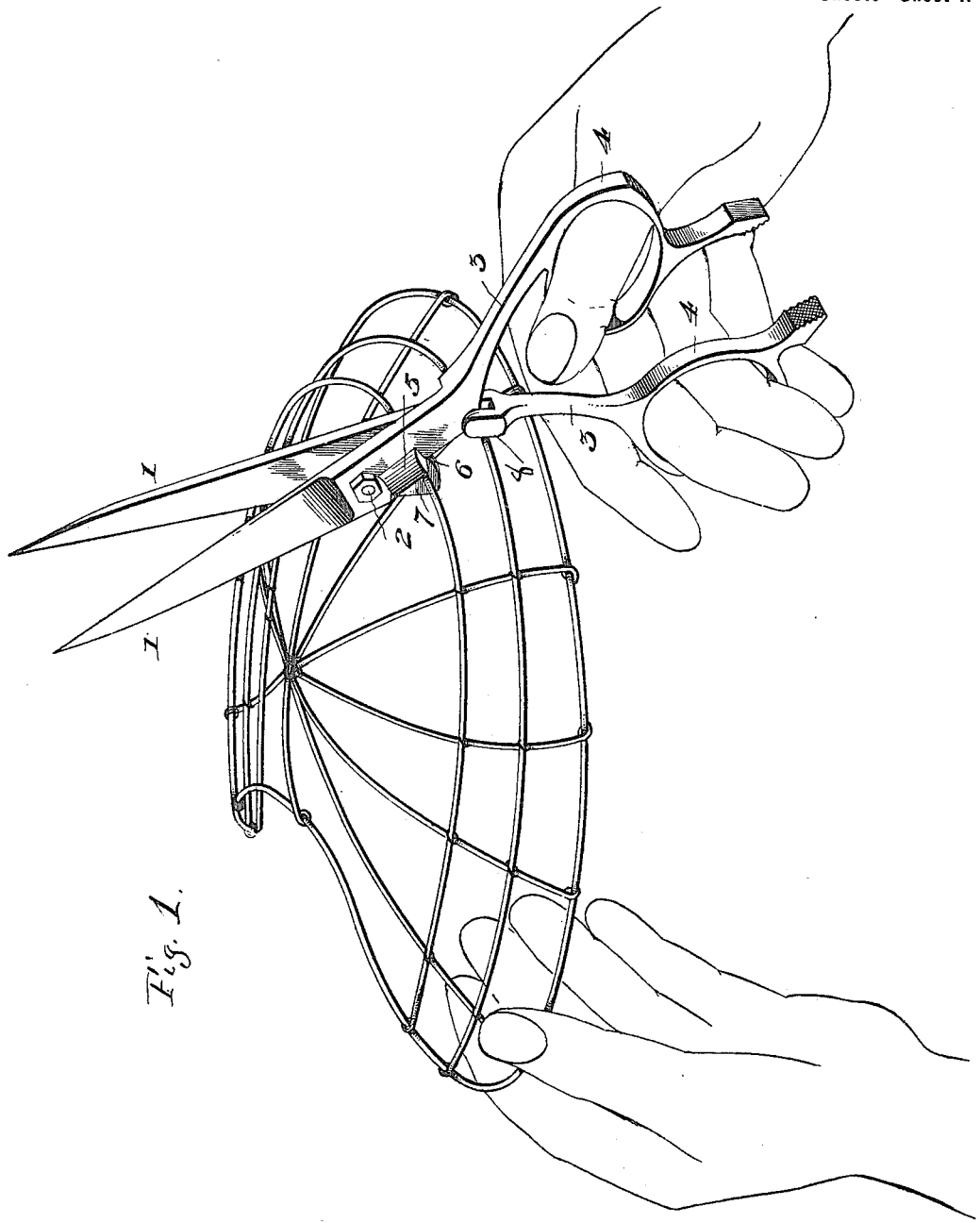

UNITED STATES PATENT OFFICE.

NELLIE O. HENAULT, OF BUTTE, MONTANA.

COMBINATION-TOOL.

SPECIFICATION forming part of Letters Patent No. 617,018, dated January 3, 1899.

Application filed February 16, 1898. Serial No. 670,543. (No model.)

*To all whom it may concern:*

Be it known that I, NELLIE O. HENAULT, a citizen of the United States, residing at Butte, in the county of Silver Bow and State of Montana, have invented certain new and useful Improvements in Combination-Tools; and I do declare the following to be a full, clear, and exact description of the invention, such as will enable others skilled in the art to which it appertains to make and use the same.

My invention has relation to combination-tools designed especially for the use of milliners.

The object of the invention is to provide a simple and inexpensive tool by means of which the wires of a bonnet-frame may be easily cut to allow of parts being removed and the remaining parts twisted together in order to permit of fashioning and trimming the frame to suit the taste of the purchaser.

With this object in view the invention consists in certain features of construction and combination of parts, which will be hereinafter fully described and claimed.

In the accompanying drawings, Figure 1 is a perspective view showing the top concentric wire of a hat-frame in the act of being severed in order to remove the same and permit of an opening being made through the crown of the frame for the purpose of applying a certain style of trimming or ornaments. Fig. 2 is a side elevation of the tool. Fig. 3 is a similar view taken from the other side, and Fig. 4 is a sectional view on line *x x* of Fig. 2.

In said drawings, 1 denotes the blades of a pair of shears pivoted together at 2. 3 denotes the shanks, and 4 finger-loops or handles. These parts may be of any well-known or approved construction, and further detail description of the same is not deemed necessary.

One of the blade-shanks has projecting laterally from its outer side a fixed wire-cutter 5, while the opposite shank is provided with a hook 6, having projecting laterally and in an inclined direction therefrom a wire-cutter 7, the cutting edges of which extend directly below and parallel with the cutting edges of the cutter 5.

In operation when it is desired to cut one of the wires of the frame—say, for instance, the upper concentric wire—the tool is placed over said wire, drawn downward, with its hook, under said wire, which guides the wire between the cutters, thus enabling the wire to be severed by the cutters and removed from the frame.

At this point I desire to state that I am aware it is not new to provide the shanks of a pair of shears with wire-cutters, as such construction is clearly shown and described in patent to R. W. Diefendorf, No. 389,553, dated September 18, 1888, and I desire to call particular attention to the fact that the cutters shown in said patent do not project laterally beyond the sides of the shanks, thus making it necessary, in order to sever a wire in a bonnet-frame, to first pass one of the handles under the ring to bring the ring between the jaws. In many crowns the wires are so closely arranged that it would be absolutely impossible for the handle of the Diefendorf tool to be inserted in the manner described, and for this reason said tool could not be used for the purpose for which my tool is designed.

I am also aware that it is not new to provide a tool with cutters that project laterally from the sides, such construction being shown in patent to L. C. Derry, No. 222,470, dated December 9, 1879. The patent to Derry, however, fails to show one of the cutters mounted upon or integral with the hook 6, and therefore would require much time and patience in holding the frame and adjusting the tool so that the wire could be cut by the knives.

In my device all that is necessary is to draw the hook down under the wire to be severed, thus guiding the cutters to their work and preventing the wire becoming accidentally disengaged from the cutters before they have performed their duty.

In order to remove all strain from the pivot 2 in the act of cutting a wire, the strain tending to bend or break the pivot, I provide one of the shanks of the blade with a guide-lug 8, which is so arranged that at the instant the wire is engaged by the cutters the opposite shank shall have passed between the guide-lug and the shank to which it is secured, thus preventing the twisting of the shanks and the consequent bending or breaking of the pivot 2.

The finger-rings or handles of the shanks are provided with two coacting pincers, which are designed for the purpose of twisting the ends of the wire together in the various stages of the manufacture or modification of a bonnet-frame.

From the foregoing description, taken in connection with the accompanying drawings, the construction and operation of the invention will be readily understood without requiring further description.

The device is exceedingly simple, may be made at small cost, and will be found to be very useful for the purpose for which it is designed.

Having thus described my invention, what I claim, and desire to secure by Letters Patent, is—

1. As an article of manufacture, scissors including two pivoted blades having integral shanks and handles, one of said shanks having projecting laterally from its outer side and extending parallel therewith, a fixed cutter, and the other shank being provided with a rearwardly-extending hook which has projecting laterally from its inner side and under the lower edge of the aforementioned shank, a fixed cutter which is parallel with and coacts with the aforesaid cutter, substantially as set forth.

2. As an article of manufacture, scissors including two pivoted blades having integral shanks and handles, one of said shanks having projecting laterally from its outer side and extending parallel therewith, a fixed cutter, and the other shank being provided with a rearwardly-extending hook which has projecting laterally from its inner side and under the lower edge of the aforementioned shank, a fixed cutter which is parallel with and coacts with the aforesaid cutter, one of said shanks being provided with a guide-lug to receive the opposite shank at the instant the cutters engage the wire to be severed, thereby removing the torsional or lateral strain from the pivot connecting the blades, substantially as set forth.

In testimony whereof I have hereunto set my hand in presence of two subscribing witnesses.

NELLIE O. HENAULT.

Witnesses:
   BENJ. G. COWL,
   A. B. SUIT.